T. C. DAVIS.
CORN PLANTER.
APPLICATION FILED DEC. 22, 1916.

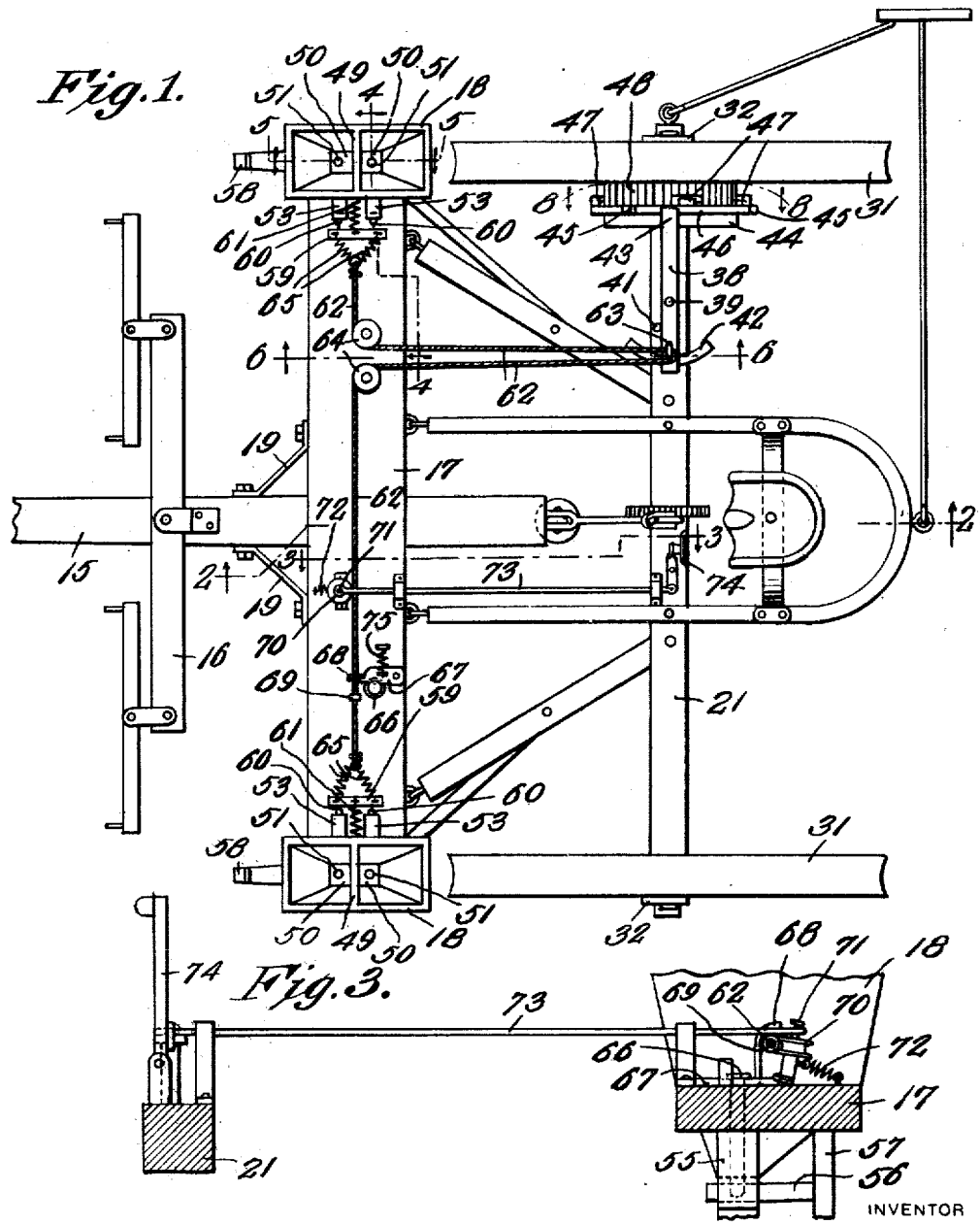

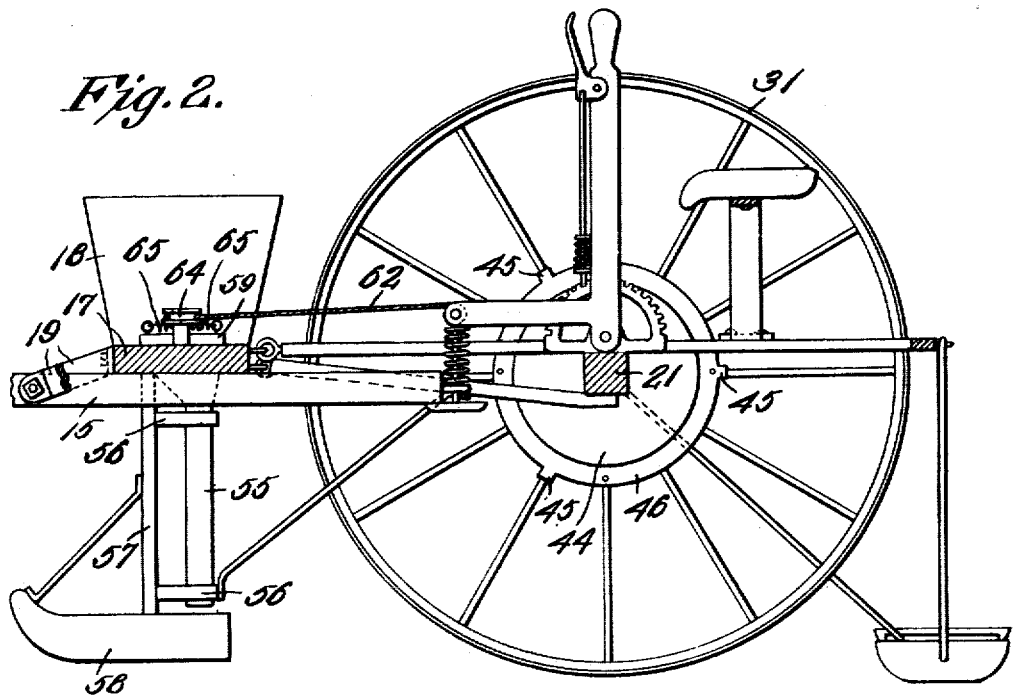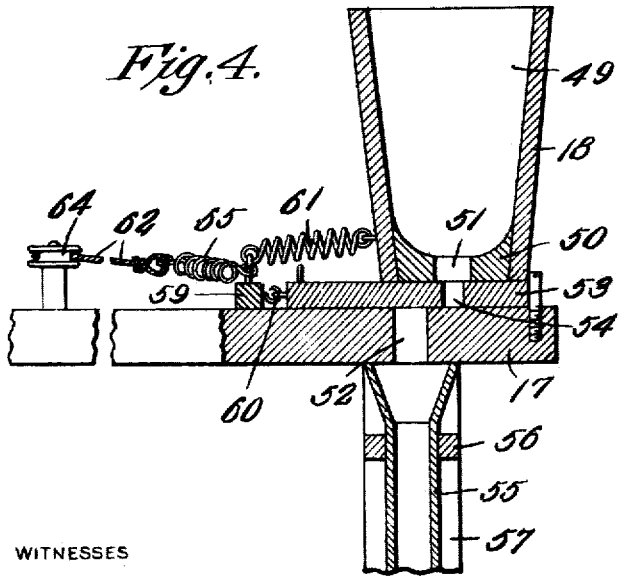

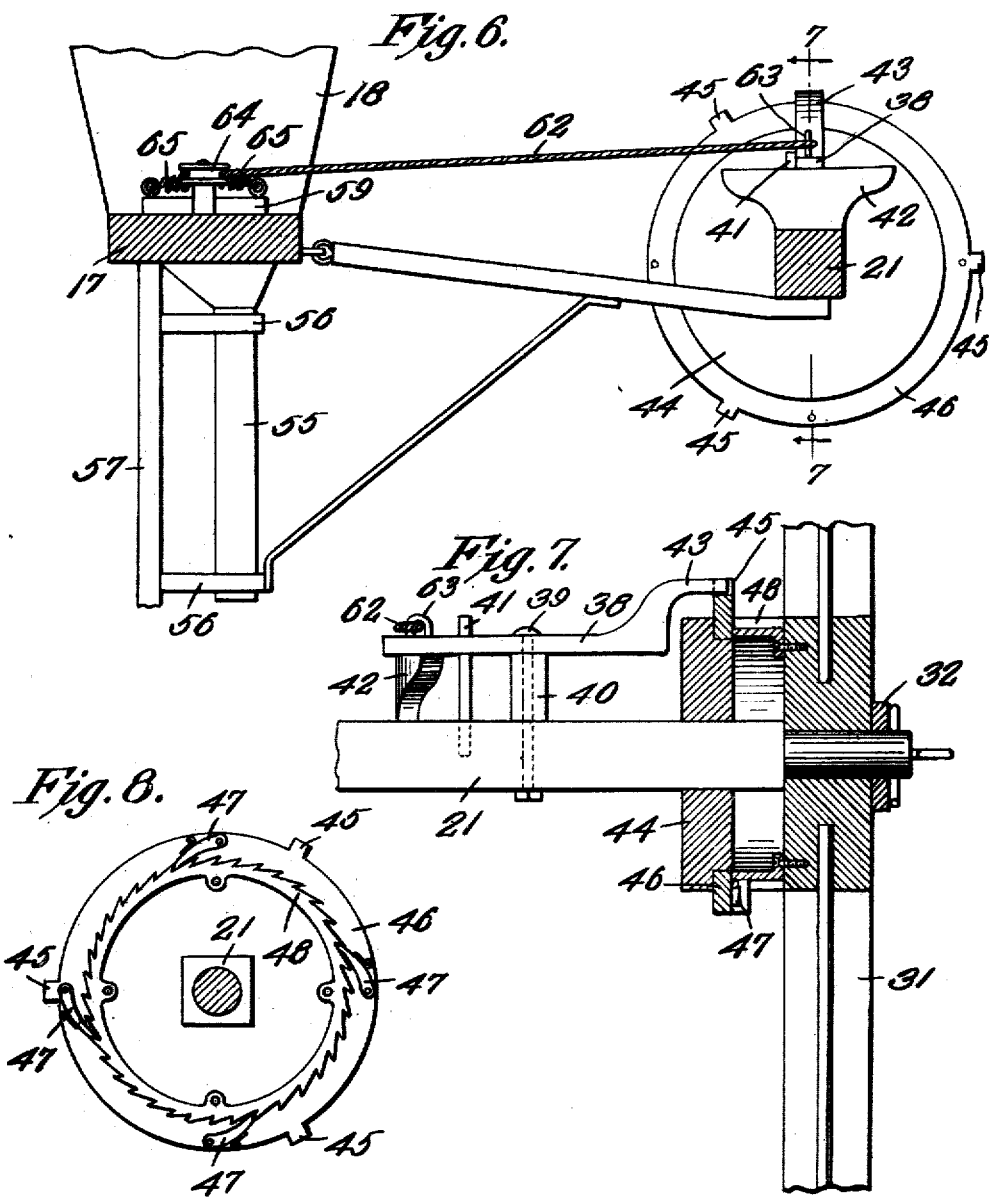

1,294,629.

Patented Feb. 18, 1919.
4 SHEETS—SHEET 4.

Witness
James F. Crown,
Ross J. Woodward.

Inventor
Thomas C. Davis,
By Richard B. Owen,
Attorney

UNITED STATES PATENT OFFICE.

THOMAS C. DAVIS, OF UHRICHSVILLE, OHIO.

CORN-PLANTER.

1,294,629.

Specification of Letters Patent. Patented Feb. 18, 1919.

Application filed December 22, 1916. Serial No. 138,473.

*To all whom it may concern:*

Be it known that I, THOMAS C. DAVIS, a citizen of the United States, residing at Uhrichsville, in the county of Tuscarawas and State of Ohio, have invented certain new and useful Improvements in Corn-Planters, of which the following is a specification.

This invention relates to an improved corn planter and the principal object of the invention is to provide a corn planter having a hopper and improved feeding means for delivering seed and fertilizer from the hopper to the outlet spout, the fertilizer and seed being delivered in measured quantities and at timed intervals with relation to the rotation of the supporting wheels.

Another object of the invention is to so construct this corn planter that the seed and fertilizer from separate hoppers may be delivered at the same time thus permitting two rows of corn to be planted with the hills in alinement.

Another object of the invention is to provide improved means for controlling the passage of the corn and fertilizer through the outlet spout thus delivering the corn in a hill and preventing it from being scattered as the machine moves across the field.

Another object of the invention is to provide improved means for moving the hopper feeding mechanism to an open position and at the same time release an indicating peg.

This invention is illustrated in the accompanying drawings, wherein:—

Figure 9:
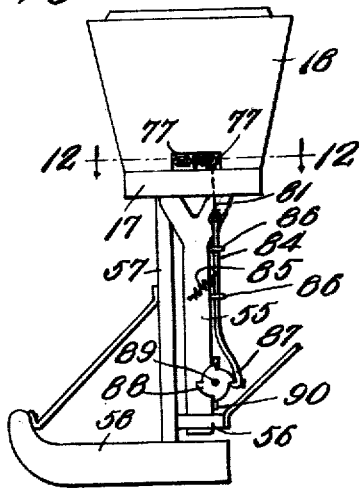
Figure 10:
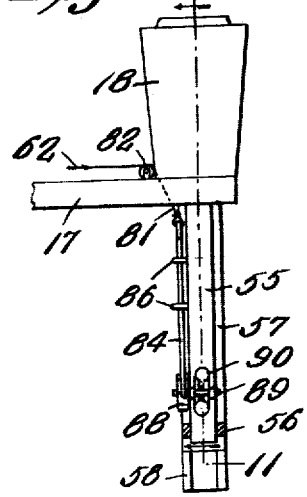
Figure 11:
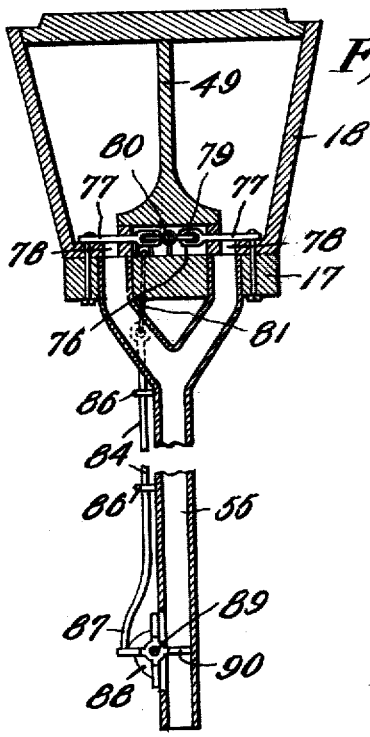
Figure 12:
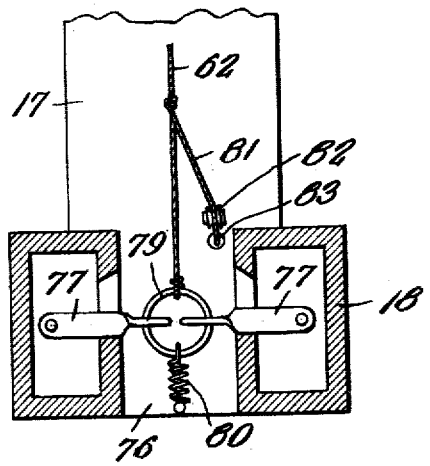

Figure 1 is a top plan view of the improved corn planting machine,

Fig. 2 is a vertical longitudinal sectional view through the improved corn planting machine taken along the line 2—2 of Fig. 1, Fig. 3 is a fragmentary sectional view taken along the line 3—3 of Fig. 1, Fig. 4 is a sectional view through one of the hoppers taken along the line 4—4 of Fig. 1, Fig. 5 is a sectional view through one of the hoppers taken along the line 5—5 of Fig. 1, Fig. 6 is a fragmentary sectional view taken along the line 6—6 of Fig. 1, Fig. 7 is a sectional view taken along the line 7—7 of Fig. 6, Fig. 8 is a sectional view taken along the line 8—8 of Fig. 1, Fig. 9 is a view showing a slightly modified form of hopper and feed pipe, the feed pipe being provided with an outlet control, Fig. 10 is a view in elevation taken at right angles to the view shown in Fig. 9, Fig. 11 is a vertical sectional view taken along the line 11—11 of Fig. 10, and Fig. 12 is a sectional view taken along the line 12—12 of Fig. 9.

This corn planting machine is provided with a frame including a tongue 15 which supports the draft equalizer 16 and is provided adjacent its rear end with a cross bar 17 forming a carrier or support for the hopper 18 and held against movement upon the tongue 15 by the bracket 19.

The wheels 31 are rotatably mounted on the axle 21 and are held in place by securing nuts 32. An actuating lever 38 is pivotally connected with the axle 21 by means of the pivot pin 39 passing through the supporting block 40 and is limited in its swinging movement in one direction by an abutment pin 41 fitting into a socket formed in the axle and removable so that when desired, the lever arm may be permitted to swing beyond the pin. This lever arm has its inner end resting upon the supporting and guiding plate 42 and has its outer end portion extended upwardly to provide a finger 43 extending across the plate 44 and into the path of the lug 45 carried by the disk 46 rotatably mounted upon the axle. Pawls 47 are carried by the plate 46 and engage the teeth of the ratchet 48 connected with the hub of the wheel so that as the wheels rotate, the plate 46 will be rotated and the lever 38 will be swung upon its pivot 39, the lever being returned to the position shown in Fig. 1 by means to be hereinafter described.

Upon each end of the hopper carrier bar 17 there is provided a hopper 18 divided into two compartments by a partition 49, one compartment of each hopper containing the corn or seed and the second containing a fertilizer such as bone dust or any other suitable fertilizer. Each compartment is provided with a bottom 50 having an outlet opening 51 formed therein and positioned out of alinement with the corresponding opening 52 of the board 17. A feeding slide 53 is slidably mounted beneath each compartment and is provided with a cutout forming a pocket 54 to receive grain or fertilizer from the compartments. When the slides are in the position shown in Fig. 4, grain and fertilizer will pass into the pockets 54 of the two slides and when the slides are drawn outwardly, the pockets 54 will be brought into registry with the opening 52 and the fertilizer and grain will pass into the outlet spout 55 carried by the bracket 56 extending from the standards 57 for the digging blades or furrow openers. Therefore the fertilizer and grain will be mixed and the corn will be buried and caused to grow well. It should be noted that the pockets 54 in the forms shown in Figs. 4 and 5 are of less diameter than the openings 51 and 52, this being due to the fact that if the pockets were of the same size as the pockets 51, too much corn would be planted in a single hill. It is the intention to provide a series of slides 53, each series being provided with openings of varying sizes, the openings of some of the slides being larger and some smaller than the openings 54 shown. Therefore when the planter is used for different grains, the slides will be changed according to the grain to be planted and it is of course obvious that as some grains might need proportionately larger or smaller amounts of fertilizer, the proper slides would be put in place. These slides 55 are connected at their outer ends with the cross heads 59 by the hooks 60 and from an inspection of Fig. 4 it will be readily seen that due to this construction, the slides can be easily disconnected from the cross heads. Springs 61 are connected with the cross heads and with the hoppers and will serve to return the cross heads and slides to the normal position shown in Fig. 4. In order to draw the slides outwardly, there has been provided a line 62 connected with the eye 63 of the actuating lever 38 and having its end portion passed around the pulleys 64 and connected with the springs 65 leading from the cross heads 59. When the wheels 31 rotate, the lugs will engage the lever 38 and move the same to draw upon the line thus drawing the slides outwardly, the proper distance, any surplus movement on the part of the lever which would tend to draw the slides outwardly beyond the desired amount being taken up by the springs 65. After the lugs move out of engagement with the lever, the springs 61 and 65 will serve to return the slides and lever to the normal position, the abutment pin 41 serving to prevent the lever from being swung in this direction beyond a desired point.

A marking pin 66 is placed in an opening formed in the board 17 and is provided with an enlarged head beneath which fits a latch 67 pivotally connected with the board 17 and provided with an upstanding abutment finger 68 for engagement by the ring or collar 69 mounted upon the line 62. A pulley 70 is rotatably mounted upon the pin 71 and when this pin 71 is drawn rearwardly against tension of springs 72 by the rod 73 leading from the foot treadle 74, the line 62 will be drawn and the collar 69 brought into engagement with the upstanding finger 68 of the latch 67 thus drawing the latch against the compression of the springs 75 and moving the latch out of engagement with the pin 66 thus permitting the pin to drop into the ground. This will serve to indicate the position of a row of corn, it being obvious that when the line 62 is drawn into a position for engagement with the finger 68 and the lever 38 moved by one of the abutments 45, the pin will be dropped between the two hills planted. By use of these pins, the alinement of the corn can be kept straight thus providing even lines across the field, both longitudinally and transversely thereof.

In Figs. 9 through 12, there has been shown a slightly modified form of hopper and feeding mechanism. In this form, each hopper will be provided with a partition 49 similar to that shown in Fig. 5 with the exception that the lower portion of the partition will be thickened and will terminate short of the bottom to provide a space forming a chamber 76 into which will extend the outer ends of the feed control plate 77 for controlling the passage of grain and fertilizer out of the outlet openings 78 of the two compartments in which the grain and fertilizer will be placed. A ring 79 engages the outer ends of these feed control plates 77 and is engaged by a spring 80 serving to normally hold the feed control plates in a closed position. The line 62 instead of being connected with the spring 65 as in the form previously disclosed, will be directly connected with the ring 79 and will further be provided with a branch 81 passing over a pulley 82 and extending through an opening 83 formed in the board 17 with its ends connected with the upper end of the elongated pawl 84. This pawl 84 which is yieldably held in a normal position by the spring 85 is guided in its sliding movement by eyes 86 and is provided at its lower end with a hook 87 which engages the ratchet wheel 88 mounted upon the shaft 89 of the paddle wheel 90. The paddles of this paddle wheel 90 are positioned to pass through an opening formed in the side of the feed spout 55 and as the grain and fertilizer pass into the spout, the grain and fertilizer will be stopped in its movement down the spout by one of the blades which extends into the spout. When the line 62 is drawn as previously described, to feed a new charge of fertilizer and grain into the spout, the paddle wheel will be rotated by the pawl 84 being drawn upwardly thus rotating the paddle wheel and permitting the grain and fertilizer resting upon the inner blade to drop out of the spout in a compact mass, at the same time a second blade being moved into position to catch the new charge. Therefore the corn which is to be planted in hills will be dropped in a compact mass and will not be scattered over a comparatively extended length of ground. When the machine is being driven to the field or is being taken back to the barn, it is not desired to have the feeding mechanism operated and therefore the pin 41 will be removed and the actuating lever swung so that its outer end will not be engaged by the abutment 48. Therefore there will be no waste of grain when going to and from the field. It should be further noted that when traveling to and from the field, it will not be desired to have the furrow openers 58 engage the ground and therefore the latch lever 27 will be moved to raise the tongue and hopper supporting board or bar 17 thus raising the furrow openers out of engagement with the ground.

What is claimed is:—

1. A grain planter comprising a carriage including a cross beam and supporting wheels, hoppers carried by the cross beam and having outlets, said cross beam being provided with an opening intermediate the hoppers, a latch yieldably held to extend partially across the opening in the cross beam, a marking pin slidably mounted in the opening and provided with a head engaged by the latch to releasably hold the pin in place, feeding means for controlling the passage of material from the hoppers, actuating means operated from said wheels including a line having its end portions extending along said cross beam and connected with the feeding means, an abutment carried by one end portion of said line, and means for moving said line to bring the abutment into engagement with said latch when the line is moved longitudinally after being moved transversely by said last mentioned means.

2. A grain planter comprising a frame including a cross beam, outlet spouts extending from said cross beam, hoppers carried by said cross beam in operative relation to the outlet spouts, a shaft rotatably connected with each of said spouts and extending across an opening formed therein, a paddle wheel mounted upon the shaft of each spout and having its paddle extending in the outlet spouts as the paddle wheel rotates to provide movable abutments, a ratchet wheel mounted upon the shaft, a pawl slidably connected with the outlet spouts and provided at its lower end with a pawl for engaging the ratchet wheel and rotating the shaft as the pawl moves in one direction, feeding means for the hoppers, actuating means including a lever, a line connected with the lever and having its end portions extending to the cross beam and connected with the feeding means, and branch lines extending from the end portions of the first mentioned line and connected with the pawls for imparting movement to the pawls and rotating the paddle wheels when the feeding means is moved to permit material from the hoppers to pass into the outlet spouts.

3. A grain planting machine comprising a carriage including a cross beam and an axle, supporting wheels rotatably mounted upon the axle, hoppers carried by the cross beam and having outlets, feeding means for controlling the passage of material out of the hoppers, a pin slidably mounted in an opening formed in the cross beam and having an enlarged head, a latch pivotally connected with the cross beam and yieldably held to engage the pin beneath the head thereof and retain the same in place, a foot treadle connected with said axle, a standard pivotally connected with said cross beam, a pulley mounted upon the standard, a rod leading from the standard to the foot treadle, an actuating lever connected with said axle and operated from one of said wheels, a line connected with the lever and extending to the cross beam and having its end portions extending along the cross beam and connected with the feeding means, and an abutment mounted upon said line, movement of the foot treadle in one direction drawing the line to permit of engagement of the latch by said abutment when the line is moved longitudinally.

In testimony whereof I affix my signature in presence of two witnesses.

THOMAS C. DAVIS.

Witnesses:
V. W. HITE,
E. C. CARROLL.